United States Patent [19]

Brewer

[11] Patent Number: 4,897,012
[45] Date of Patent: Jan. 30, 1990

[54] CARGO HANDLING SYSTEM

[75] Inventor: Bruce L. Brewer, Alliance, Ohio

[73] Assignee: Custom Technologies, Inc., Beloit, Ohio

[21] Appl. No.: 117,545

[22] Filed: Nov. 6, 1987

[51] Int. Cl.$^4$ .......................... B60P 1/00; B65G 63/00
[52] U.S. Cl. .................... 414/540; 414/137.4; 414/139.4; 414/140.3; 414/140.4; 414/141.4; 414/141.6; 414/341; 414/347; 414/348; 414/786; 414/262; 212/212; 212/219; 187/16; 187/95
[58] Field of Search ............... 414/137, 139, 141, 341, 414/347, 659, 786; 182/131, 142; 187/16, 95; 212/211, 212, 219

[56] References Cited

U.S. PATENT DOCUMENTS

| | | | |
|---|---|---|---|
| 691,719 | 1/1902 | Greth | 187/1 R |
| 1,525,950 | 2/1925 | Prescott | 414/139 |
| 2,572,165 | 10/1951 | Locki | 187/95 X |
| 3,520,396 | 7/1970 | Lingg | 414/139 X |
| 3,630,390 | 12/1971 | Tax et al. | 414/139 |
| 3,727,776 | 4/1973 | Meeusen | 414/139 |
| 3,812,987 | 5/1974 | Watatani | 414/139 X |
| 3,814,211 | 6/1974 | Pamer | 182/142 |
| 3,952,891 | 4/1976 | Terayama et al. | 414/786 |
| 4,172,685 | 10/1979 | Nabeshima et al. | 414/139 |
| 4,175,908 | 11/1979 | Andersson | 414/786 |
| 4,293,077 | 10/1981 | Makino | 212/219 |
| 4,431,359 | 2/1984 | Toniolo | 414/139 |

FOREIGN PATENT DOCUMENTS

| | | | |
|---|---|---|---|
| 276173 | 3/1965 | Australia | 212/219 |
| 304711 | 4/1918 | Fed. Rep. of Germany | 212/219 |
| 1950176 | 5/1970 | Fed. Rep. of Germany | 212/219 |
| 2316052 | 10/1973 | Fed. Rep. of Germany | . |
| 1031730 | 3/1953 | France | 414/139 |
| 60-151194 | 8/1985 | Japan | 187/16 |
| 627011 | 10/1978 | U.S.S.R. | 414/137 |
| 796130 | 1/1981 | U.S.S.R. | 414/139 |
| 706559 | 3/1954 | United Kingdom | 414/141 |
| 1219574 | 1/1971 | United Kingdom | 414/139 |

Primary Examiner—Robert J. Spar
Assistant Examiner—James T. Eller
Attorney, Agent, or Firm—Renner, Kenner, Greive, Bobak, Taylor & Weber

[57] ABSTRACT

A system for transporting cargo between a storage area and a cargo carrier. The system includes a bridge (13) and boom (15) spanning between the storage area and the cargo carrier. A first elevator (14) is located at one end of the bridge (13) proximate to the storage area. A second elevator (16) is located at the distal end of the boom (15) positionable relative to the cargo carrier. Trackways (20, 21, 22 and 23) along the bridge (13) and boom (15) interconnect the first and second elevators (14 and 16). Independent cars (24) are provided to carry the cargo. Each car (24) is movable on the first and second elevators (14 and 15) and further along the trackways (20, 21, 22 and 23).

18 Claims, 4 Drawing Sheets

CARGO HANDLING SYSTEM

TECHNICAL FIELD

This invention relates to material handling system, such as ship loading and unloading system and a method for using the same. More particularly, this invention relates to a method and apparatus for loading and unloading wherein the apparatus utilizes elevators interconnected with a bridge structure and where the apparatus is mounted on a quay and movable with respect thereto.

BACKGROUND ART

There are known various constructions of devices for loading and unloading ships and other cargo carriers. Exemplary of such devices is the reknown standard crane which adorns ports worldwide. These cranes are mounted on the quay of a port, or in some constructions to a mobile base. The crane generally is provided with a hook which suitably is configured so as to engage cargo to be loaded to, or unload from, a ship moored to the quay. To load, the crane hook engages cargo resting upon the quay and is then moved vertically and horizontally toward the moored ship. The cargo is then deposited at a desired location on the ship and precisely located through independent means. Unloading proceeds via a similar process.

This typical construction suffers from a variety of problems. First, inasmuch as the crane hook cannot handle cargo during its return time from the ship back to the quay during loading, efficiency of the process is low. Second, the utilization of independent means, especially during unloading as required on the quay to remove deposited cargo, mandates coordination between handlers which is often difficult to obtain. In the case where the removal of cargo from the quay fails to coincide with the unloading cycle of the crane, either a pile up or extensive "dead time" is experienced.

Others have attempted to obviate some or all of these problems. One early construction is the cargo handling apparatus of U.S. Pat. No. 1,525,950, to Prescott. The apparatus disclosed therein comprises a bridge, a cantilever arm, a ship leg and a pier leg. The leg members and arm utilize continuous conveyors for conveying the cargo remote from the apparatus. The conveyors comprise trays having concave-grid arm bottoms which move circuitously throughout the entire apparatus.

U.S. Pat. No. 3,952,891, to Terayama et al., and 4,172,685, to Nabeshima et al., provide methods of improved handling of cargo with use of container cranes.

U.S. Pat. No. 4,175,908, to Anderson, discloses an apparatus and method of loading and unloading heavy objects. The complex apparatus disclosed therein provides an alternative to harbor cranes or pontoon cranes. According to the method a heavy object is lifted from the quay, or a vehicle driveable along the quay, moved along girders to a position above the hold of a ship, and then lowered into the hold of the ship. While providing a viable method of loading heavy objects, the method suffers from inefficiency and other problems discussed hereinabove.

U.S. Pat. No. 4,293,077, to Makino, is directed to a container handling apparatus which provides an improvement of an existing crane. The apparatus comprises a traveling portal frame having a container transfer space and an elevating device. A truck is also provided as a container transport vehicle. In operation, the portal frame is moved along the quay to a desired position. While providing mobility, such action limits the usefulness of that portion of the quay which must be reserved for this frame movement.

It should be evident, while the art has provided ameliorations of harbor crane structures, a truly efficient method and apparatus for loading and unloading of ships has not heretofore been known. A further problem in the loading and unloading of ships is encountered when the cargo being handled may not be exposed to the elements. For example, unloading of paper goods in rainy weather may not be accomplished without destruction of at least some of the cargo.

In this regard, the aforesaid U.S. Pat. No. 1,525,950, discloses the use of a support means/shield means which is fitted over the hold of the ship. The cargo is not, however, protected from the elements as it is unloaded from the ship to the quay.

Russian Pat. No. 796,130 discloses the use of a flexible shield means which is fitted over the hatch of a ship and is interconnected to an encloses container handler. The shield means however is not capable of being adapted to different sized hatches or hatches at different angles due to the mooring of the ship.

DISCLOSURE OF THE INVENTION

It is therefore a primary object of the present invention to provide a truly efficient material handling system for use in the loading and unloading of ships.

It is another object of the present invention to provide a material handling system, as above, wherein large scale jobs and large objects may be unloaded or loaded with relative ease.

It is a further object of the present invention to provide a material handling system, as above, which is movably fixed to the quay of the port and angularly adjustable with respect to vessels moored to the quay.

It is a still further object of the present invention to provide a material handling system, as above, which enables loading or unloading of cargo which can be protected from the elements of the weather throughout the process.

It is yet another object of the present invention to provide a material handling system, as above, wherein cargo can be easily removed from within the ship through the hatch.

These and other objects of the present invention, as well as the advantages thereof over existing and prior art forms, which will be apparent in view of the following specification, are accomplished by means hereinafter described and claimed.

In general, a system for transporting cargo between a storage area and a cargo carrier includes a bridge structure spanning between the storage area and the cargo carrier. A first elevator is located at one end of the bridge structure proximate to the storage area. A second elevator is located at the other end of the bridge structure positionable relative to the cargo carrier. A trackway extends along the bridge structure interconnecting the first and second elevators. Independent cars are also provided for carrying the cargo. The cars are movable on the first and second elevators, and also long the trackway.

One preferred, exemplary embodiment of a cargo handling system incorporating the concept of the present invention is shown by way of example in the accompanying drawings without attempting to show all the various forms and modifications in which the invention might be embodied, the invention being measured by the appended claims and not by the details of the specification.

EXEMPLARY EMBODIMENT FOR CARRYING OUT THE INVENTION

Figure 1:
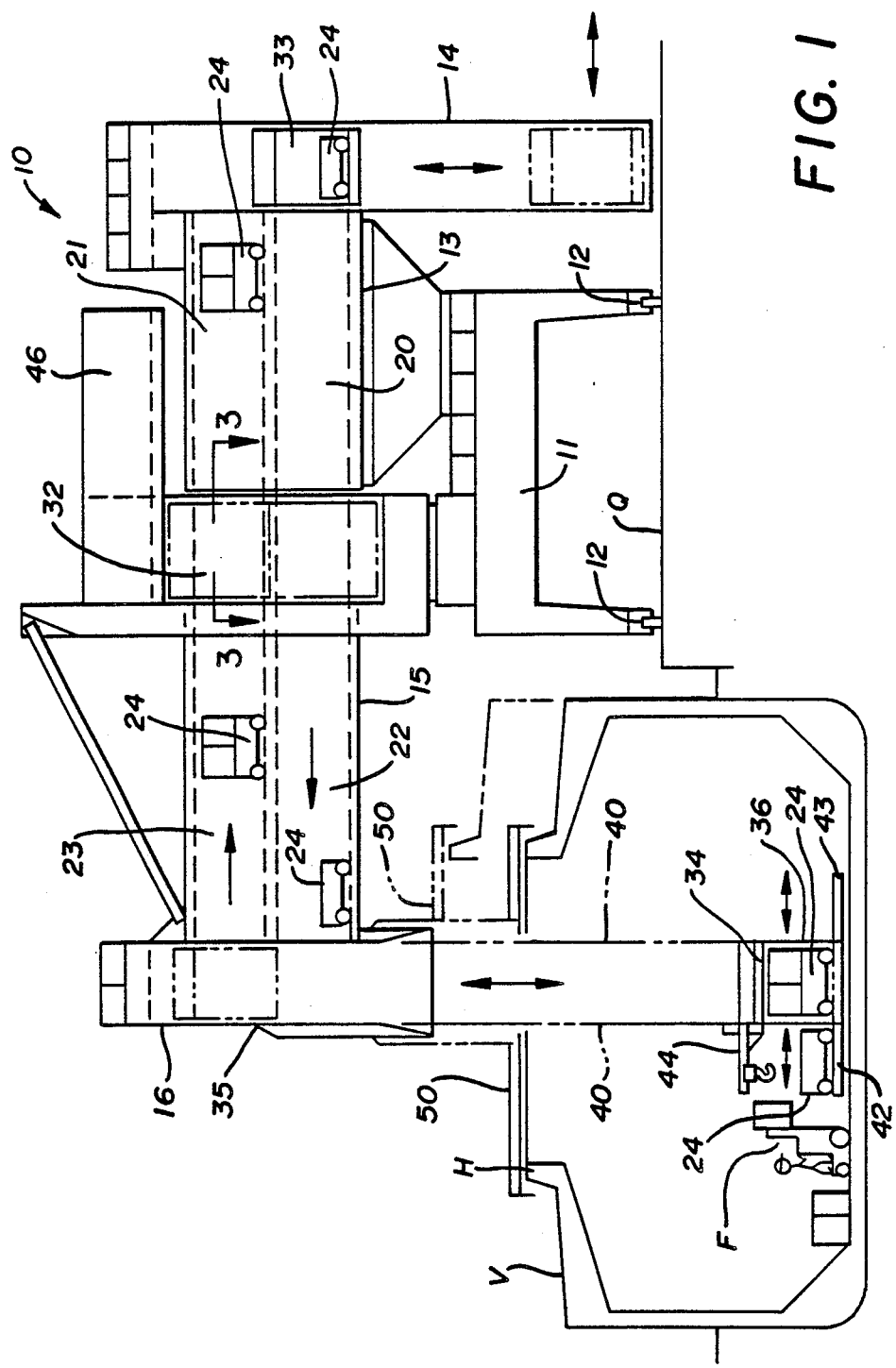
FIG. 1 is an elevational schematic view of a cargo handling system embodying the concept of the present invention.

A cargo handling system, according to the concept of the present invention, is indicated generally by the numeral 10 in FIG. 1 of the accompanying drawings. Such a cargo handling system 10 is positioned on a quay (Q) to facilitate loading and unloading a cargo shipping vessel (V). The cargo handling system 10 basically includes a portal frame 11 which can travel along the quay (Q) using suitable travel drives 12, known in the art. A fixed bridge structure 13 is carried on portal frame 11. On the dock side of fixed bridge structure 13 is located a dockside elevator 14 as will be discussed more fully hereinbelow.

At the opposite side of the fixed bridge structure 13 is a rotating boom structure 15. As will be appreciated hereinbelow, rotating boom structure 15 constitutes an operable extension of fixed bridge structure 13 for purposes of handling the cargo. A shipside elevator 16 is mounted at the distal end of boom structure 15 for movement therewith.

Before discussing the details of the present invention, it will be beneficial to appreciate certain features of the structure heretofore described. The cargo handling system 10 is suitable for selective positioning relative to the vessel (V) with which it is being used; and more specifically it is positionable with respect to the particular holds of the vessel (V). The mobility of the cargo handling system 10 is derived from travel drives 12 which enable the cargo handling system 10 to be positioned along the quay (Q) and by rotating boom structure 15 which swings outward from the quay (Q) to position shipside elevator 16 relative to a hatch opening (H) of the vessel (V) as depicted in FIG. 2.

Figure 2:
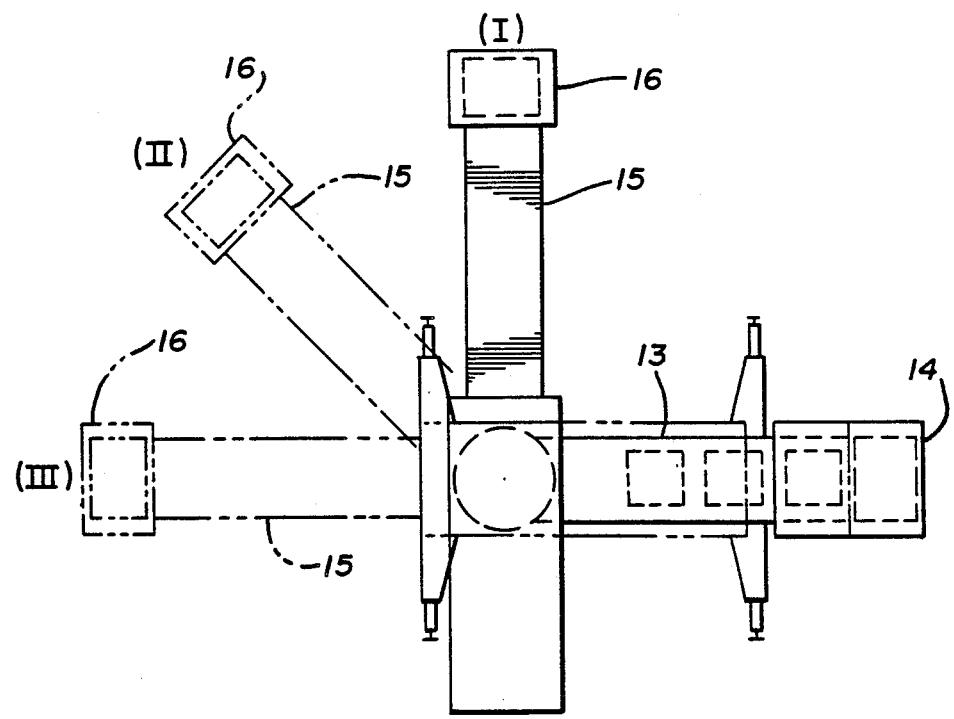
FIG. 2 is a top plan schematic view of the cargo handling system of FIG. 1.

Specifically with reference to FIG. 2, the cargo handling system 10 is depicted with boom structure 15 in its stored position (I), shown in solid lines. Such a position permits cargo vessels to be docked and moored alongside the quay (Q) free of any obstruction by the cargo handling system 10. When a cargo vessel has been properly moored, boom structure 15 may be swung outward from its stored position (I) to a partially extended position (II) or a fully extended position (III), each depicted in broken lines in FIG. 2, as necessary to align shipside elevator 16 over a desired hatch opening.

Another aspect of the cargo handling system 10 which should be appreciated is the fact that it provides protection to the cargo against weather. In order to provide such protection, the respective cargo passageways of bridge structure 13, dockside elevator 14, boom structure 15 and shipside elevator 16 all are enclosed with protective material. Such material is well known in the art and may include structural metal, or similar building material.

Turning now to the specific structure of the invention, fixed bridge structure 13 houses a pair of trackways, designated as lower bridge trackway 20 and upper bridge trackway 21. These trackways, 20 and 21, communicate at one end with dockside elevator 14 and at the other end with corresponding lower boom trackway 22 and upper boom trackway 23, respectively, housed within boom structure 15. As will be appreciated hereinbelow, the foregoing network of trackways constitute a portion of the material handling passageways of the cargo handling system 10, and are suitably configured to permit travel of cargo cars 24 therethrough.

Figure 3:
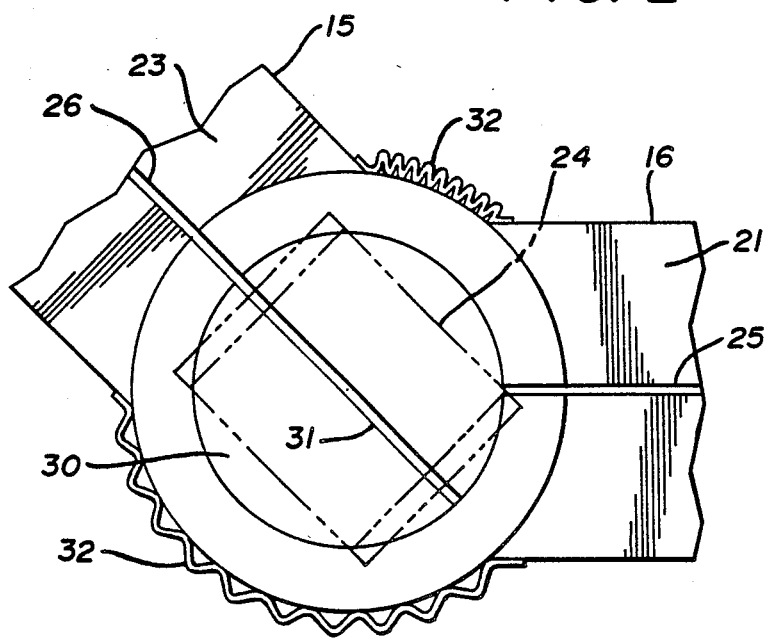
FIG. 3 is an enlarged fragmentary plan view of the articulated member of the bridge of the cargo handling system taken substantially along line 3—3 of FIG. 1.

Inasmuch as lower trackways, 20 and 22, respectively, are substantially identical to upper trackways, 21 and 23, respectively, discussion will be directed to the latter, with reference being made to FIG. 3. Specifically, each trackway 21 and 23 includes a guide rail, 25 and 26, respectively, to guide cargo cars 24, as will be more fully discussed hereinbelow. A rotatable platform 30 interfaces between bride trackway 21 and boom trackway 23 and includes a platform rail 31. Rotatable platform 30 serves to accept a cargo car 24 for one trackway, for example bridge trackway 21, and then align it with the other trackway, boom trackway 23, so as to permit cargo car 24 to continue onward as will be discussed hereinbelow. Rotatable platform 30 is particularly useful whenever boom structure 15 is not aligned with bridge structure 13. Flexible wall members 32 serve to enclose rotating platform 30 to facilitate weatherproofing. The nature of wall members 32 permit substantially unrestricted movement of boom structure 15 relative to bridge structure 13.

Dockside elevator 14 provides a means for moving cargo cars 24 between the bridge structure 13 and the quay level (Q) as depicted in FIG. 1. Specifically, a carrier 33 travels within dockside elevator 14 carrying cargo cars 24 between either lower bridge trackway 20 or upper bridge trackway 21 and the quay (Q). Suitable sensors and controllers, known in the art, are provided to stop carrier 33 at the appropriate locations to receive or discharge cargo cars 24.

Similarly, shipside elevator 16 provides a means in the form of a carrier 34 for moving cargo cars 24 between rotating boom structure 15 and the cargo hold of the vessel (V). Unlike dockside elevator 14, the housing 35 of shipside elevator 16 does not extend down to the lowermost limit of travel of carrier 34. Rather, housing 35 terminates above the uppermost deck of the vessel (V). The lowermost travel of carrier 34 is defined by a work station 36 which may be lowered from housing 35 into the cargo hold of the vessel (V).

Figure 4:
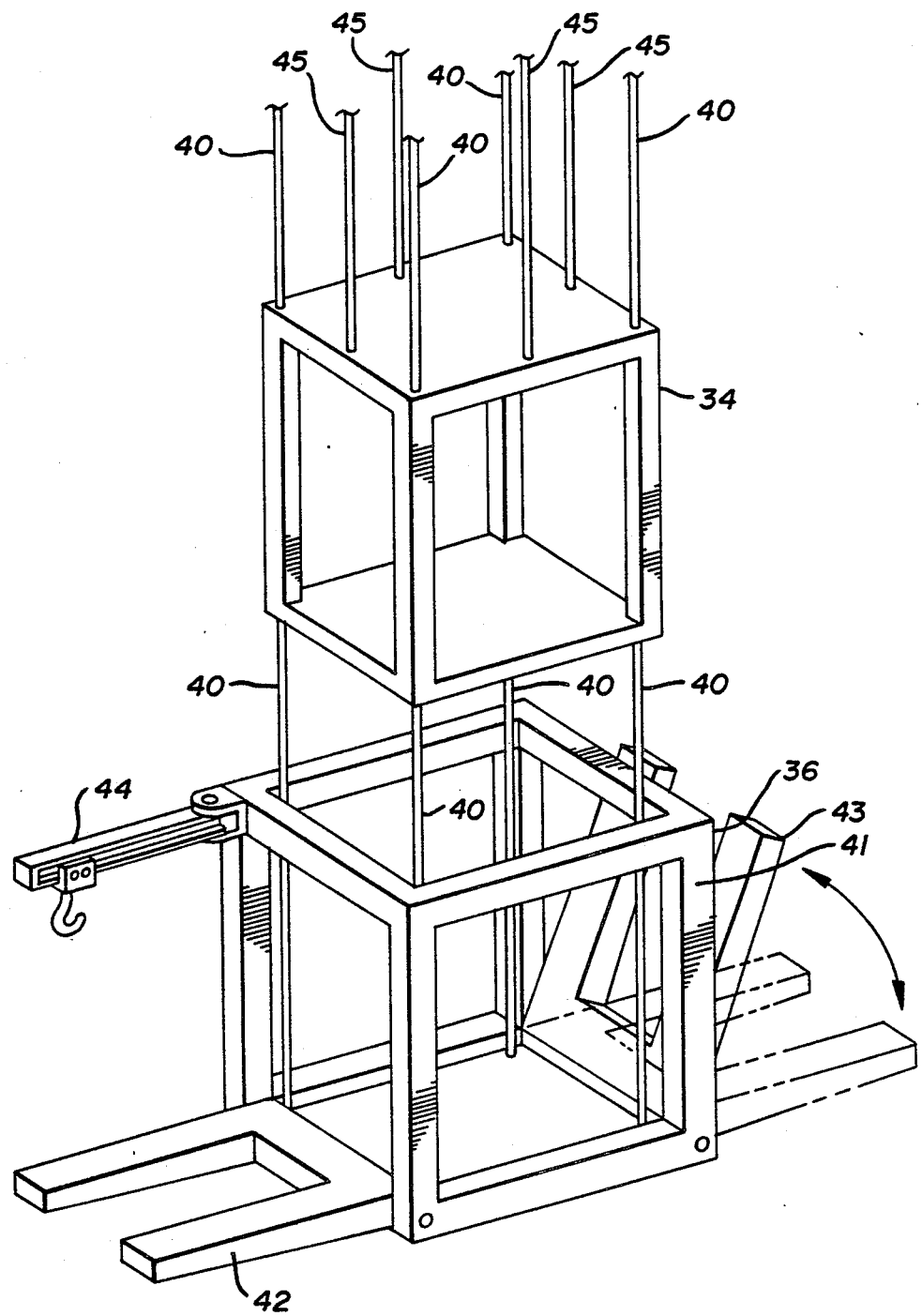
FIG. 4 is a fragmentary perspective view of the shipboard loading station and hoist platform of the cargo handling system of FIG. 1.

With reference to FIG. 4, work station 36 is lowered, and supported by, suitable cables or ropes 40. These may be affixed to the four lower corners of work station 36 and operatively connected to suitable winches to raise and lower work station 36 as desired. Work station 36 preferably has a cubical framework 41 with a pair of foldable platforms 42 and 43, respectively, mounted on opposite sides thereof. Platforms 42 and 43 are suitably configured to support cargo cars 24 when extended, and to fold upright into framework 41 to provide a compact assembly while work station 36 is maneuvered through a hatch opening (H). Once work station 36 is positioned within the cargo hold of the vessel (V), work platforms 42 and 43 may be extended to facilitate handling of cargo, as will be appreciated hereinbelow. Work station 36 also may be provided with at least one suitable jib crane structure 44, which preferably is mounted so as to be foldable against framework 41. Jib crane 44 provides suitable means to facilitate handling of cargo, as will be discussed hereinbelow.

Carrier 34 is moved between work station 36 and lower boom trackway 22 or upper boom trackway 23 as desired using suitable cables or ropes 45 operatively connected to suitable winches. As with dockside elevator 14, suitable sensors and controllers are provided to stop carrier 34 at the appropriate locations to receive or discharge cargo cars 24.

Inasmuch as carrier 34 travels below housing 35 of shipside elevator 16, it is preferable to use cables 40 of work station 36 as guides for carrier 34. Specifically, as depicted in FIG. 4, cables 40 may be passed through suitable guide openings in carrier 34 such that carrier 34 may slide freely therealong. Cables 40 are maintained taunt against the weight of work station 36 to provide adequate guidance for carrier 34.

As heretofore discussed, work station cables 40 and carrier cables 45 are operatively connected to suitable winches. Such winches may preferably be located in a machinery house 46 remote from shipside elevator 16, as depicted in FIG. 1. Indeed to counter-balance the combined weight of boom structure 15 and shipside elevator 16, machinery house 46 preferably is located diametrically opposite therefrom about the fulcrum point defined by the centerline of rotation of boom structure 15. In such fashion, boom structure 15 and shipside elevator 16 may handle greater cargo loads without exceeding the safe working limits of the structures.

Shipside elevator 16 may carry, about the lower end of housing 35, a hatch cover 50 suitable for being placed over the hatch opening (H) of the vessel (V) while the cargo with the hold is being handled. Hatch cover 50 is useful to maintain the weatherproof integrity of the cargo handling system 10 by shielding the cargo hold from inclement weather during loading and unloading processes. Hatch cover 50 also is useful when refrigerated cargo is being handled as it facilitates maintaining the low temperature within the refrigerated hold.

Hatch cover 50 is suitably mounted to housing 35 such that it is freely adjustable vertically as depicted in FIG. 1. Specifically, hatch 50 may be secured to housing 35 as by a winch and cable system or other suitable system for moving hatch cover vertically as would be well known to one skilled in the art of hoists. In this fashion, hatch cover 50 may be fully raised to permit freedom of movement of boom structure 15 as it swings over the cargo vessel (V). Furthermore, as the cargo vessel (V) is loaded or unloaded the displacement thereof in the water may change and the vertical movability of hatch cover 50 assures proper securement thereof over the hatch opening (H) throughout the cargo handling process.

Figure 5:
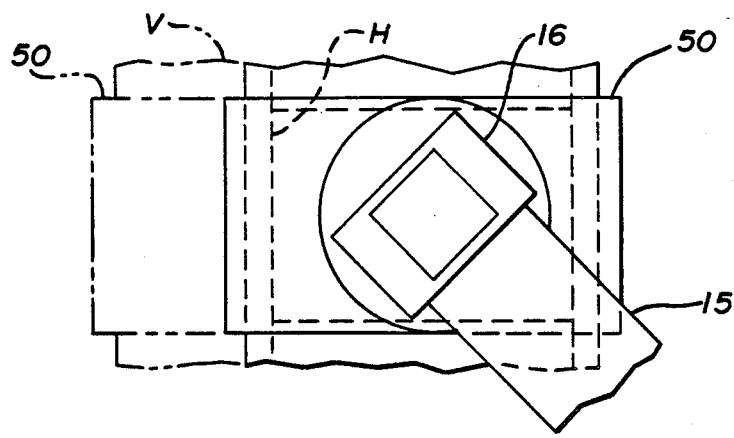
FIG. 5 is an enlarged fragmentary plan view of the hatch cover shown in FIG. 1.

In addition to vertical movement, hatch cover 50 is rotatable about housing 35 and also is expandable, as depicted in FIG. 5. As would be known to the skilled artisan, hatch 50 may be rotatably secured relative to housing 35 by suitable bearing supports well known in the art. Such bearing supports may be incorporated into the assembly for vertically moving hatch 50 in a manner obvious to one skilled in the art, to facilitate rotational and elevational movement of hatch 50 relative to housing 35. Such mobility enables hatch cover 50 to be usable on many different size hatch openings (H) and when boom structure 15 is oriented at different angles over the vessel (V).

It should be appreciated that the present invention heretofore described provides a structure ideally suited for efficiently handling cargo in a weatherproof environment. Actual movement of the cargo through the foregoing structure is accomplished by means of cargo cars 24. Specifically a plurality of cargo cars 24 are utilized to transport the cargo through the system. These cargo cars 24 may be designed primarily to travel in a straight line and can be driven using a mechanical drive system independent of cargo cars 24. However, it may be more preferable that each cargo car 24 be substantially self-contained with its own drive system utilizing an on board power source, such as batteries, or an external power source, such as an electrified collector system. In any event, it is preferred that cargo cars 24, specifically the movement thereof throughout the system, be controlled and tracked using a suitable programmable logic controller system. In this manner, the unmanned cargo cars 24 may be properly controlled at all times.

Figure 6:
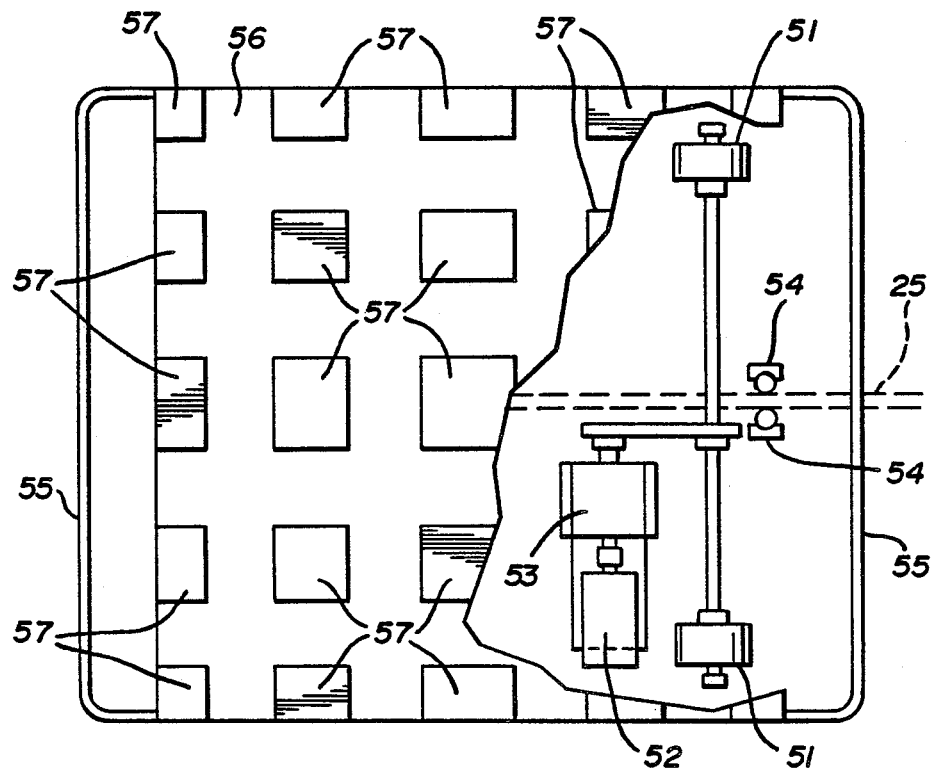
FIG. 6 is a top plan view, partially in cross-section, of a transport car of the cargo handling system of FIG. 1.

With reference to FIG. 6, the structure of cargo cars 24 can be appreciated. Principally, each cargo car 24 provides the structural framework to support and move a load of cargo. The travel drive assembly provides the means for moving cargo car 24 from one location to another. The wheels 51 are driven by a suitable drive motor 52 and gear train assembly 53. Guide roller assemblies 54 are located at each end of cargo car 24 to engage the guide rail system, as for example bridge guide rail 26, to assure proper guidance at all times during movement of cargo car 24 throughout the cargo handling system 16.

Inasmuch as cargo cars 24 preferably are unmanned, an emergency stop system should be provided to prevent collisions with adjacent cars or any unplanned obstruction. Such an emergency stop system may employ a safety bumper rail 55 on each end of cargo car 24 which is integrated with the drive system so as to stop movement of cargo car 24 immediately whenever bumper rail 55 contacts an obstruction, so that the body 56 of cargo car 24 does not contact the obstruction.

Pallet supports 57 are provided along the top surface of body 56. These supports 57 are suitably arranged in such a manner as to permit easy access of standard forklift tines from all sides while maintaining adequate support for the load. It also may be preferable to provide adequate depth between pallet supports 57 to permit insertion of special load handling devices which may be used during the handling process.

In addition to the emergency stop system, and to facilitate unmanned operation of cargo cars 24, the cargo handling system 10 may have suitable position sensors mounted throughout the cargo car path. Such position sensors indicate and confirm the location of each cargo cars 24 at all times. Similarly, slow down sensors, stop sensors and start sensors may be located at each end of cargo car 24 to slow, stop and start, respectively, cargo car 24 at appropriate locations are designated by the programmable logic control systems. Of course, if desired, operation of cargo cars 24, and the cargo handling system 10 overall, may be controlled manually. The use of a suitable logic controller, however, which currently are available in the art, frees the system to act somewhat automatically and provides for a more efficient handling of cargo with the cargo handling system 10.

The cargo handling system 10 as heretofore discussed may be more fully understood and appreciated by considering the operation of the same in conjunction with the unloading of a cargo vessel (V) which has been moored to the quay (Q) on which the cargo handling system 10 is located. Shipside elevator 16 is positioned over an open hatch (H) by maneuvering portal frame 11 and boom structure 15. Hatch cover 50 is lowered onto the deck so as to close the hatch (H) and protect the contents of the hold from weather elements.

Cargo cars 24 are released in the system 10 from the designated temporary storage areas on bridge trackways 20 and 21. Specifically, cargo cars 24 which are located on upper bridge trackway 21 are loaded onto carrier 33 of dockside elevator 14 which lowers them to, and discharges them onto, lower bridge trackway 20. Cargo cars 24 then travel to rotatable platform 30 which aligns the cargo cars 24 with lower boom trackway 22, where they proceed to shipside elevator 16.

During the repositioning of cargo cars 24, or prior thereto, work station 36 is lowered into the cargo hold via cables 40. As the hold generally may be filled with palletized cargo, work station 36 is suspended immediately above the top of the cargo. Work platforms 42 and/or 43 are extended outward and work station 36 is ready to begin transporting cargo. Carrier 34 receives a cargo car 24 from the lower boom trackway 22 and lowers it down to work station 36 where it moves outward onto one of the platforms 42. Carrier 34 returns to lower boom trackway 22 to receive and lower another cargo car 24.

While this is taking place, the first cargo car 24 on platform 42 may be loaded using jib crane 44 to lift the cargo from the hold and set it onto cargo car 24. By the time the first cargo car 24 is loaded, the next cargo car 24 has been lowered to work station 36 and moved out onto platform 43 for loading. The loaded cargo car 24 is moved onto carrier 34 which raises it to upper boom trackway 23 where the cargo car 24 is discharged. Carrier 34 then proceeds downward to lower boom trackway 22 to receive an empty cargo car 24 to transport down to work station 36, thereby continuing the cycle.

The loaded cargo car 24 which is discharged onto upper boom trackway 23 proceeds to rotatable platform 30 where it is aligned with upper bridge trackway 21. The loaded cargo car 24 proceeds therealong to be received by carrier 33 of dockside elevator 14 which lowers it down to a transfer station which permits unloading the cargo car and/or cargo for subsequent handling outside of the system 10. Carrier 33 then returns empty cargo car 24 to lower bridge trackway 20 thereby continuing the material handling process.

Returning to the activity at work station 36, as more cargo is unloaded from the hold, work station 36 continually is lowered until it rests on the inner deck of the hold. When sufficient cargo has been removed from the hold, forklift trucks (F) may be carried into the hold from the quay (Q) via empty cargo cars 24 to facilitate handling of cargo within the hold and to load cargo cars 24 at work station 36.

It should be appreciated that work station 36 provides a highly maneuverable platform to facilitate handling of cargo. Indeed, it may continually be repositioned, vertically and horizontally within the hold to accommodate the workers handling the cargo therein.

When the cargo handling system 10 achieves a consistent operation rhythm—loaded and unloaded cargo cars 24 are moving consistently through the system—efficient cargo handling is achieved. Indeed, the cargo handling system 10, with four forklift trucks (F) operating within the hold of the vessel (V), is capable of moving one cargo car load per minute from the hold. Such capacity generally is accomplished when the system utilizes the aforesaid programmable logic control system to monitor and control the position and movement of the cargo cars 24, carriers 33 and 34, and work station 36.

To load a cargo vessel (V) utilizing the disclosed cargo handling system 10, the operation sequence heretofore described is reversed with obvious modifications. Namely, loaded cargo cars 24 are moved into the hold while empty cargo cars 24 are returned to the quay (Q). Work station 36 is raised as the hold becomes filled with cargo.

In view of the foregoing disclosure, it should be evident that a cargo handling system embodying the concept of the invention disclosed herein enables the efficient handling of cargo from a vessel and carries out the various objects of the invention. As such, the foregoing invention constitutes an advantageous contribution to the art.

I claim:

1. A system for transporting cargo between a storage area and a cargo carrier comprising:
   bridge means spanning between the storage area and the cargo carrier said bridge means having a bridge structure, a boom structure pivotable about one end of said bridge structure in a substantially horizontal plane and platform means interposed between said bridge structure and said boom structure to present a rotatable interface therebetween;
   first elevator means located at one end of said bridge structure proximate to the storage area;
   second elevator means located at one end of said boom structure positionable relative to the cargo carrier;
   cover means supported at said one end of said boom structure about said second elevator means, said cover means being movable elevationally relative to said boom structure, said cover means further being rotatable about said second elevator means;
   trackway means along said bridge means interconnecting said first and second elevator means said trackway means including bridge trackway along said bridge structure and boom trackway along said boom structure; and
   a plurality of independent car means for carrying the cargo, each said car means being movable selectively on said first and second elevator means, and further independently along said trackway means.

2. A system according to claim 1, further comprising frame means movable relative to the storage area, said bridge means being supported by said frame means.

3. A system according to claim 1, wherein said bridge trackway includes an upper track and a lower track and said boom trackway includes an upper track and a lower track, said platform means communicating said upper track of said bridge trackway with said upper track of said boom trackway, and further communicating said lower track of said bridge trackway with said lower track of said boom trackway.

4. A system according to claim 3, wherein each said car means includes independent drive means to move said car means independently along each said upper track and each said lower track and onto, and off of, each said first and second elevator means selectively.

5. A system according to claim 4, further comprising means to control the position of said car means.

6. A system according to claim 5, wherein said means to control includes rail means along said trackway means said car means being guided along said rail means.

7. A system according to claim 6, wherein said means to control further includes means to control the speed of said car means.

8. A system according to claim 7, wherein said means to control the speed includes sensors on said car means to detect obstructions in the path of said car means.

9. A system according to claim 1, wherein said second elevator means includes housing means communicating with said trackway means and a work station lowerable from said housing means.

10. A system according to claim 9, wherein said second elevator means further includes a carrier for moving said car means between said trackway means and said work station.

11. A method of handling cargo between a first cargo area and a second cargo area comprising the steps of:
positioning a first portion of a bridge, having a first elevator, relative to the first cargo area;
rotating a second portion of the bridge in a horizontal plane relative to the first portion of bridge to position a second elevator relative to the second cargo area;
lowering a work station from the second elevator to the level of the cargo at the second cargo area;
introducing a plurality of independent movable cars from the first cargo area;
transporting each of said movable cars independently and selectively along the first elevator, the second elevator and the bridge;
extending at least one platform from the work station;
positioning the plurality of movable cars on the platform and the lowered work station for handling cargo within the second cargo area;
loading cargo onto the movable cars at the one cargo area; and,
removing cargo from the movable cars at the second cargo area.

12. A method, according to claim 11, further comprising moving the work station in response to changes in the level of cargo in the second cargo area.

13. A system for transporting cargo between a storage area and a cargo carrier comprising:
bridge means spanning between the storage area and the cargo carrier said bridge means having a bridge structure, a boom structure pivotable about one end of said bridge structure in a substantially horizontal plane and means interposed between said bridge structure and said boom structure to present an interface therebetween;
first elevator means located at one end of said bridge structure proximate the storage area;
second elevator means located at one end of said boom structure selectively positionable relative to the level of the cargo in the cargo carrier;
tracking means along said bridge means interconnecting said first and second elevator means, said tracking means including a bridge trackway along said bridge structure and a boom trackway along said boom structure; and
a plurality of independent car means for carrying the cargo, each said car means being selectively receivable by the system at ends proximate the storage area and the cargo carrier, and being capable of moving independently and selectively on said first and second elevator means, and said trackway means, whereby said car means may be driven on and off or through the system, driven from the storage area to the system, and delivered to the cargo carrier from the system, and wherein said car means may be used for transporting cargo outside the system.

14. A system according to claim 13, wherein said second elevator means includes a work station lowerable selectively to the level of the cargo in the cargo carrier, said work station including an extendable platform to accommodate a plurality of car means simultaneously.

15. A system according to claim 14, wherein said second elevator means further includes a carrier for moving said car means between said trackway means and said work station while said work station is positioned proximate the level of the cargo in the cargo carrier.

16. A system according to claim 15, wherein each said car means includes independent drive means to move said car means independently along each said upper track and each said lower track and onto, and off of, each said first and second elevator means selectively.

17. A system according to claim 16, further comprising means to control the position of said car means.

18. A system according to claim 17, wherein said means to control includes rail means along said trackway means said car means being guided along said rail means.

* * * * *